United States Patent [19]

Marubashi

[11] Patent Number: 4,577,177

[45] Date of Patent: Mar. 18, 1986

[54] DISPLAY APPARATUS FOR ELEVATOR CAR

[75] Inventor: Akira Marubashi, Aichi, Japan

[73] Assignee: Mitsubishi Denki Kabushiki Kaisha, Tokyo, Japan

[21] Appl. No.: 615,530

[22] Filed: May 31, 1984

[30] Foreign Application Priority Data

Jun. 1, 1983 [JP] Japan ................... 58-97220

[51] Int. Cl.⁴ ............................... B66B 3/00
[52] U.S. Cl. ............................ 340/19 R; 340/815.31; 455/612
[58] Field of Search ............ 340/19 R, 20, 21, 815.31; 455/612

[56] References Cited

U.S. PATENT DOCUMENTS 4,473,841  9/1984  Murakoshi et al. ............ 455/615 X
4,490,606  12/1984  Lockett et al. ................. 455/615 X
4,521,771  6/1985  Alton ......................... 340/815.31 X

OTHER PUBLICATIONS

J. C. Urbach et al., "Laser Scanning for Electronic Printing" Proceeding of the IEEE, vol. 70, No. 6, Jun. 1982, pp. 597–618.

*Primary Examiner*—James L. Rowland
*Assistant Examiner*—Jeffery A. Hofsass
*Attorney, Agent, or Firm*—Wenderoth, Lind & Ponack

[57] ABSTRACT

A display apparatus has a light modulator with an electrooptical Pockels cell disposed in a machine room to modulate a laser beam with a modulating signal from a signal source as determined by a piece of image information to be displayed. After its passage through an optical fiber, the modulated laser beam enters an elevator car where it is focussed on a horizontal deflector by a diminishing lens and then reflected to be focussed on a vertical deflector by a collecting lens. The focussed laser beam is collected on an inner surface of an elevator door by an objective lens. Each deflector is a galvanometer mirror attached to a coil and horizontally or vertically deflecting the laser beam through an angle proportional to a saw tooth current flowing through the coil under the control of the signal source. This results in the display of the piece of image information on the inner surface of the elevator door.

10 Claims, 4 Drawing Figures

EXHIBITION SITE IS
AT 6-TH FLOOR

DISPLAY APPARATUS FOR ELEVATOR CAR

BACKGROUND OF THE INVENTION

This invention relates to improvements in a display apparatus for displaying an image information within an elevator car.

A known display apparatus of the type referred to has been located within a box-shaped housing having an end open and detachably closed with a thin transparent cover and fixed at that end opposing to the open end to an upper-portion of an operating board disposed on one of two opposite lateral walls defining an entrance of an elevator car therebetween. The display apparatus is of a projection type and has comprised a projection screen applied to the inner surface of the thin transparent cover, and a plurality of projection lamps, for example, three lamps disposed at predetermined equal intervals adjacent to the end of the housing fixed to the operating board to be substantially equidistant from the projection screen. Disposed between the projection screen and each of the projection lamps have been an image printed film and a projection lens for the film. The films and the projection lenses have been positioned so that the images on all the films are selectively focussed on a common area of the projection screen by means of the associated projection lenses to be displayed to a passenger or passengers within the elevator car as different pieces of image information.

The projection lamps have been connected to a signal source disposed on a stationary part for example, in a machine room for the elevator car through respective electrical conductors included in a tail cord extending between the elevator car and the stationary part.

When the signal source fires a selected one of the projection lamps, the image on that film irradiated with the fired lamp is projected and focussed on the projection screen by means of the associated projection lens to be exhibited to a passenger or passengers within the elevator car as a piece of image information intended to be displayed to the passenger or passengers. Also by selectively firing the projection lamps, a plurality of pieces of image information or displayed contents can be selected.

However, the projection type display apparatus as described above have been disadvantageous in the following respects: A space of the operating board given by the projection screen is limited and also the projection lamps and the image printed films should be arranged in a limited space. Thus the number of the projection lamps and that of the image printed films have limited the number of different pieces of information to be displayed. Furthermore, upon a change in pieces of image information, an attendant in charge had been necessary to go to the elevator car in order to exchange the image printed film resulting in a troublesome job. Moreover since the projection screen is required to be disposed in a limited place, there has been a fear that the projection screen is out of a visual field or fields of a passenger or passengers within the elevator car.

Accordingly it is an object of the present invention to provide a new and improved display apparatus for an elevator car enabled to selectively display different pieces of image information without a limitation due to the number of the pieces of image information.

It is another object of the present invention to provide a new and improved display apparatus for an elevator car in which a piece or pieces of image information to be displayed can readily be changed without a necessity of causing an attendant in charge to go to the elevator car.

It is still another object of the present invention to provide a new and improved display apparatus for an elevator car difficult to be subjected to a limitation due to a visual field or fields of a passenger or passengers within the elevator car.

SUMMARY OF THE INVENTION

The present invention provides an apparatus for displaying image information within an elevator car, comprising a projector disposed in an elevator car and formed of a light deflector, a diminishing lens disposed on an entrance side of the light deflector and an objective lens disposed on an exit side thereof; a laser disposed on a stationary part for an elevator system including the elevator car to form a light source for generating a light beam, a signal source disposed on the stationary part to generate a modulating signal as determined by a piece of image information to be displayed, a light modulator disposed on the stationary part to modulate the light beam from the light source with the modulating signal from the signal source; an optical fiber for leading the modulated light beam from the light modulator to the diminishing lens included in the projector, and a set of electrical conductors for connecting the signal source to the light deflector; the arrangement being such that the light beam deflected by the light deflector is focussed on an inner surface of the elevator car by means of the objective lens.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
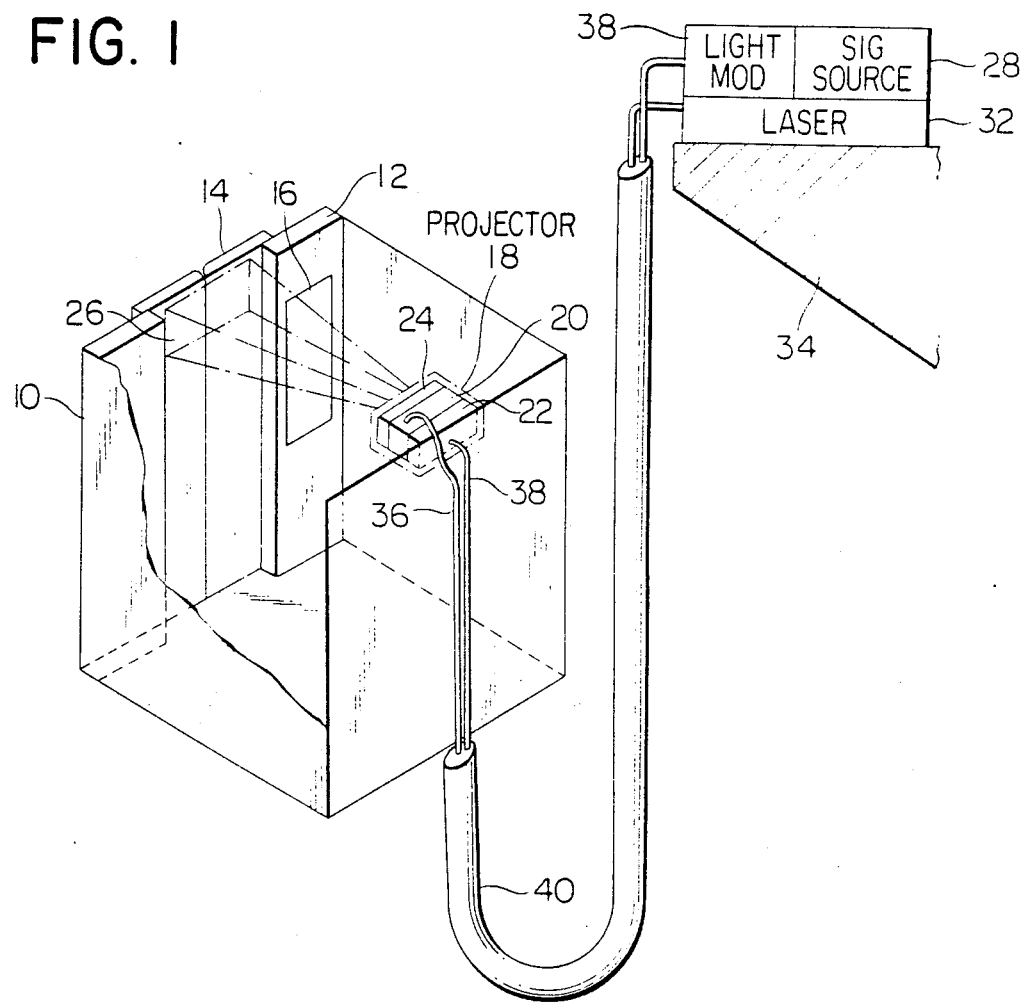
FIG. 1 is a respective view of one part of a display apparatus according to one embodiment of the present invention disposed in an elevator car and a side elevational view of the other part of the display apparatus disposed on a stationary part for the elevator car and connected to the one part thereof through an optical fiber and a set of electrical conductors with a ceiling of the elevator car and one portion of a side wall thereof omitted.

Referring now to FIG. 1 of the drawings, there is illustrated a display apparatus according to one embodiment of the present invention. The arrangement illustrated comprises an elevator car 10 including an entrance defined by a pair of lateral walls 12 closed when a pair of opposite sliding doors 14 abut against each other. The entrance is opened when the sliding doors 14 are moved away from each other. An operating board 16 is disposed on one of the lateral walls 14, in this case, the righthand lateral wall 12 as viewed in FIG. 1.

In FIG. 1, a projector generally designated by the reference numeral 18 is shown as being fixed to the central portion of the upper inner wall surface of the elevator car 10 facing the entrance thereof so as to contact the adjacent portion of a ceiling (not shown) of the elevator car 10. The projector 18 includes light deflector 20, a diminishing lens 22 located on the entrance side of the deflector 20 adjacent to the wall of the elevator car 10 to which the projector 18 is fixed, and an objective lens 24 on the exit side thereof opposite to the entrance of the elevator car 10 to form a rectangular projection field 26 occupying the substantial portion of the upper inner surfaces of the sliding doors 14 put in their closed position for the purpose as will be apparent later.

The display apparatus further comprises a signal source 28, a light modulator 30 and a laser 32 as a light source disposed on a stationary part 34, for example, in a machine room for the elevator car 10. The signal source 28 drives the light modulator 30 and is connected to the light deflector 20 through a set of electrical conductors 36 to drive the light deflector 20. The light modulator 30 is optically coupled to the diminishing lens 22 through an optical fiber. To this end the optical fiber 38 has one end opposing to the diminishinq lens 22, although that end of the optical fiber 38 is not illustrated only for the purposes of illustration.

As shown in FIG. 1, a tail cord 40 has included therein those portions of the electrical conductors 36 and the optical fiber 38 extending between the elevator car 10 and the stationary part 34.

In the operation the light source or the laser 32 disposed on the stationary part 34 generates a laser beam while the signal source 28 applies to the light modulator 30 a modulating signal from a video signal generator (not shown) or the like selected in accordance with a piece of image information to be displayed. Thus the light modulator 30 modulates the laser or light beam from the laser 32 with the modulating signal applied thereto from the signal source 20 to form an amplitude modulated light beam. The amplitude modulated light beam is entered into the optical fiber 38 and then reaches the diminishing lens 22 included in the projector 18 disposed within the elevator car 10. The diminishing lens 22 collects the modulated light beam on the light deflector 20.

At that time, the light deflector 20 receives a scanning signal generated by the signal source 28 and passed through the set of electrical conductors 36 to be driven. Thus the light deflector 20 deflects the light beam collected thereon in the horizontal direction and simultaneously in the vertical direction. The objective lens 24 collects the light beam thus scanned in the horizontal and vertical directions on the projection field 26 on the upper, inner surfaces of the sliding doors 14 in their closed positions.

From the foregoing it is seen that the sliding doors 14 in their closed positions have an image displayed on the upper inner surfaces thereof with the light beam modulated by the light modulator 30 and then subjected to a raster or a random scan. The image thus displayed can be viewed by a passenger or passengers within the elevator car 10.

In the arrangement shown in FIG. 1, a piece of image information or a displayed content can be changed only by changing video signal by the signal source 28 disposed on the stationary part 34 without the necessity of causing an attendant in charge to go to the elevator car to change on image printed film or films as in the conventional display apparatus as described above. Therefore a displayed contents can readily be changed even with the number and types of displayed contents large. Also the displayed field can utilize a wide area of the sliding doors in their closed positions and therefore a visual field or fields of a passenger or passengers within the elevator car is or are less subjected to a limitation due to the displayed field.

Figure 2:
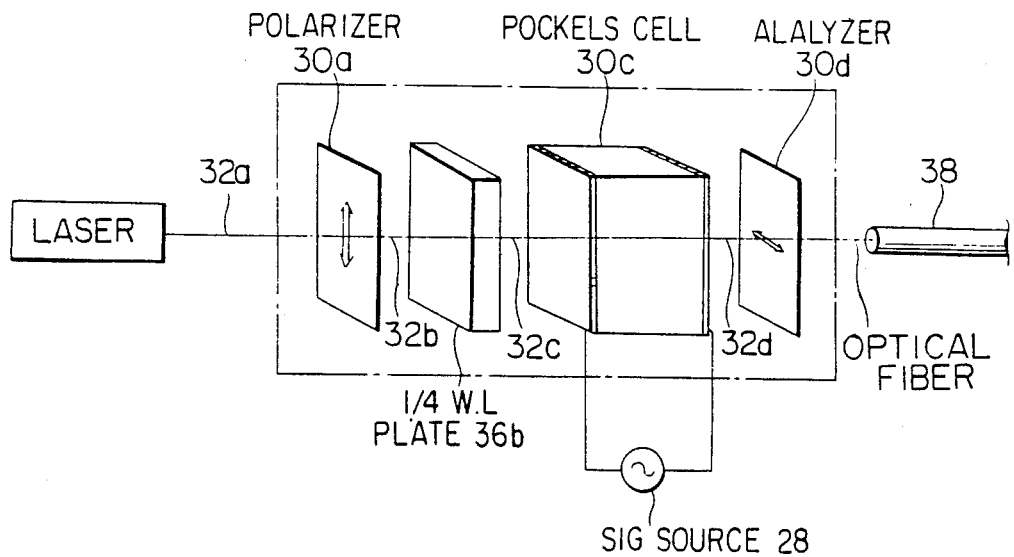
FIG. 2 is a block diagram of the light modulator shown in FIG. 1 with parts illustrated in perspective.

FIG. 2 shows, by way of example, the details of the light modulator 30 illustrated in FIG. 1. The arrangement illustrated utilizes the Pockels effect, and comprises the light modulator 30 disposed between the laser 32 and the optical fiber 36 to be aligned with one another in a common optical axis. A laser beam 32a generated from the laser 32 is not polarized but it passes through a polarizer 30a to change to a linearly polarized light beam 32b which is, in turn, incident upon a quarter-wavelength plate 30b. The quarter-wavelength plate 30b may be formed of a material exhibiting a spontaneous birefrigerance, for example, a quartz or a mica. The linearly polarized light beam 32b passes through the quarter-wavelength plate 30b to change a circularly polarized light beam 32c which is, in turn, applied to an electrooptical Pockels cell modulator 30c. The Pockels cell modulator 30c is formed, for example, of a single crystal $Bi_{12}SiO_{20}$ and includes a pair of transparent electrodes attached to the entrance and exit ends thereof and connected across the signal source 28 showing as an AC type. The electrooptic crystal has a pair of refractive indices in two orthogonal directions in a plane perpendicular to a direction in which a voltage is applied thereacross, variable in accordance with a magnitude of the applied voltage. After having passed through the electrooptical Pockels cell 30c, the circularly polarized light beam 32c is changed to an elliptically polarized light beam 32d which, in turn, falls on an analyser 30d. A light beam 32e leaving the analyzer 30d has an intensity or an amplitude variable in accordance with the magnitude of the voltage applied across the electrooptic Pockels cell 30c is entered into the optical fiber 38.

In other word, the laser beam 32a with a constant output generated by the laser 32 is changed to an amplitude modulated light beam 32e which is, in turn, applied to the optical fiber 38.

The amplitude modulated light beam 32e is passed through the optical fiber 38 and incident upon the diminishing lens 22 included in the projector 18 disposed in the elevator car 10.

Figures 3, 4:
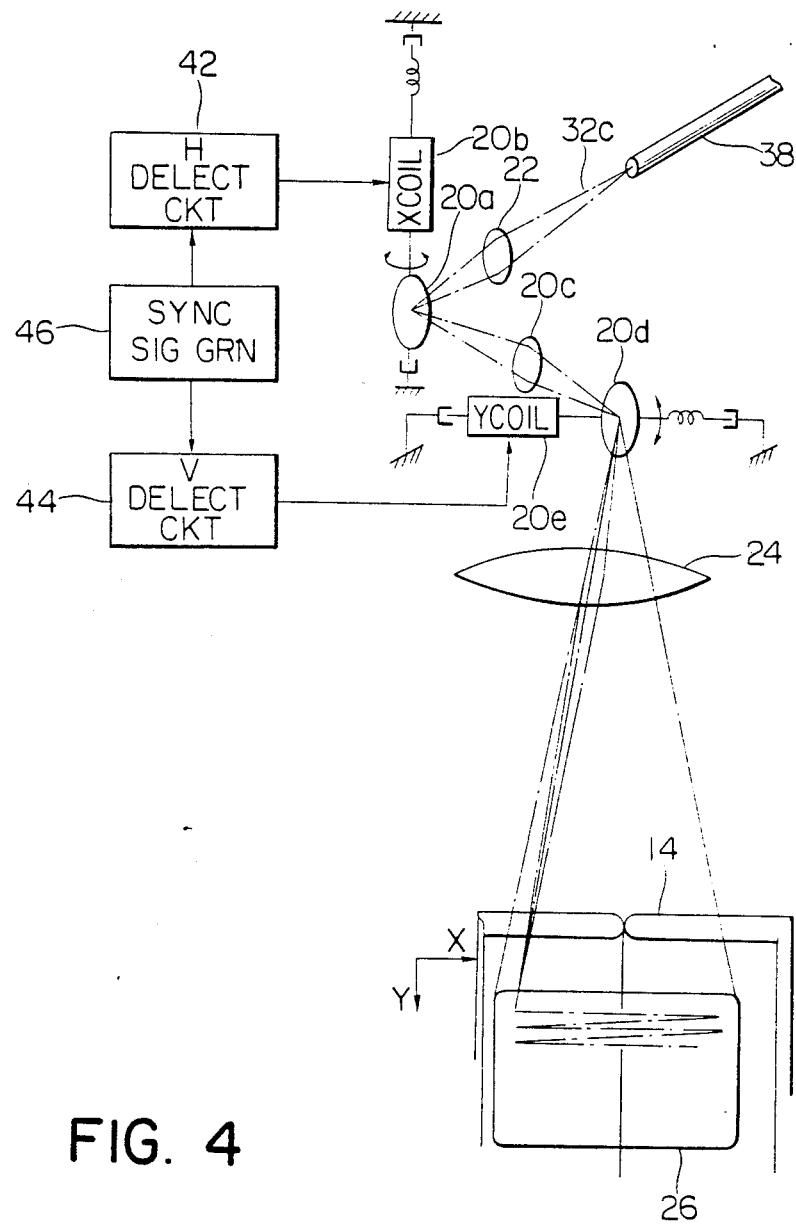
FIG. 3 is a block diagram of the projector shown in FIG. 1.
FIG. 4 is a side elevational view of a piece of image information displayed on an inner wall surface of the elevator car.

FIG. 3 shows, by way of example, the details of the projector 18 including the light deflector 20 which utilizes galvanometer mirror. Thus the projector 18 also functions as a light scanner. As shown in FIG. 3, the amplitude modulated light beam 32e is focussed on an X galvanometer mirror 20a by the diminishing lens 22. The mirror 20a is fixedly connected to an X galvanometer coil 20b and the resulting connection is arranged in a spanned state along a vertical axis as viewed in FIG. 3 through a spring so as to be rotatable about the vertical axis.

The light beam 32e focussed on the X mirror 30a is reflected therefrom toward a collecting lens 20c which, in turn, focusses the reflected light beam on a Y galvanometer mirror 20d. The mirror 20d is fixedly connected to a Y galvanometer coil 20e and the resulting connection is arranged in a spanned state along a horizontal axis as viewed in FIG. 3 through a spring so as to be rotatable about the horizontal axis.

The light beam focussed on the Y mirror 20d is again reflected therefrom toward the objective lens 24, which, in turn, focusses the reflected light beam on the projection field 26 on the upper, inner surfaces of the sliding doors 14 in their closed positions.

As shown in FIG. 3, a horizontal and a vertical deflection circuit 42 and 44 respectively are connected to the X and Y coils 20b and 20e respectively to supply saw tooth currents thereto respectively under the control of synchronizing signals generated by a synchronizing signal generator 46. The synchronizing signal generator 46 is connected to the signal source 28 disposed on the stationary part 34 through the set of electrical conductors 36 to be put in synchronization with the signal source 28.

The deflection circuits 42 and 44 and the synchronizing signal generator 46 may be similar to those used with conventional television receivers.

The X coil 20b and therefore the X mirror 20a is deflected through a rotational angle as determined by the saw tooth current flowing through the coil 20b and about the vertical axis as described above. Thus the light beam scans a horizontal line extending along the X axis on the projection field 26 as shown on the lower portion in FIG. 3.

Similarly the Y coil 20e and therefore the Y mirror 20d is deflected through a rotational angle as determined by the saw tooth current flowing through the coil 20e and about the horizontal axis as described above. Thus the light beam scans the projection field 26 in a vertical direction or along the Y axis as shown on the lower portion in FIG. 3.

It is noted that if an image from the projector 18 fails to be accurately projected on the projection field 26, a trapezoid or a trapezium deformation results. This trapezoid or trapezium deformation can be compensated for by the objective lens 24. Alternatively such a deformation may be compensated for by modulating an angle of deflection of the mirror in the X direction with a Y signal.

FIG. 4 shows one example of a piece of image information or a displayed content is projected on the projection field 26 which reads

"EXHIBITION SITE IS AT 6-TH FLOOR".

This displayed content can lead a passenger or passengers within the elevator car to the exhibition site without any misguiding.

While the present invention has been illustrated and described in conjunction with a single preferred embodiment thereof it is to be understood that numerous changes and modifications may be resorted to without departing from the spirit and scope of the present invention. For example, pieces of image informations including figure patterns other than letters can be selectively displayed on the projection field. While one embodiment of the present invention has been illustrated and described in conjunction with the projection of a laser beam on a door for an elevator car, it is to be understood that the projector can be mounted on a wall surface of the elevator car different from that facing the entrance thereof. In the latter case the projection field can be formed on a wall surface of the elevator car opposing to the wall surface to which the projector is mounted. Also a pair of projectors may be used to simultaneously display different pieces of image information on the surface of a door and on the wall surface orthogonal to the door's surface. Furthermore a plurality of elevator cars may be operatively associated with a single set of the laser, the light modulator and the signal source disposed on the stationary part so as to cause each of projectors disposed in the respective elevator cars to effect a display. Moreover while the present invention is has been discribed in terms of the stationary part disposed in the machine room it is to be understood that the same is not limited thereto or thereby and the it is equally applicable to the stationary part located on a supervision board disposed in a supervision room for the elevator car. Also while the present invention has been illustrated and described in conjunction with the optical fiber 38 it is to be understood that the optical fiber may be replaced by a bundle into which a multitude of optical fibers are arranged.

What is claimed is:

1. An apparatus for displaying image information within an elevator car, comprising a projector disposed in an elevator car and formed of a light deflector, a diminishing lens disposed on an entrance side of said light deflector, and an objective lens disposed on an exit side thereof; a laser disposed on a stationary part for an elevator system including the elevator car to form a light source for generating a light beam, a signal source disposed on said stationary part to generate a modulating signal as determined by a piece of image information to be displayed, a light modulator disposed on said stationary part to modulate said light beam from said light source with said modulating signal from said signal source; an optical fiber for leading said modulated light beam from said light modulator to said diminishing lens included in said projector, and a set of electrical conductors for connecting said signal source to said light deflector; the arrangement being such that the light beam deflected by said light deflector is focussed on an inner surface of said elevator car by means of said objective lens.

2. An apparatus for displaying image information within an elevator car as claimed in claim 1 wherein there is provided a tail cord having portions of said optical fiber and said set of electrical conductors extending between said elevator car and said stationary part and formed into a unitary structure therewith.

3. An apparatus for displaying image information within an elevator car as claimed in claim 1 wherein said light deflector deflects in a horizontal and a vertical direction said light beam focussed by said diminishing lens with a horizontal and a vertical scanning signal from said signal source supplied through said set of electrical conductors.

4. An apparatus for displaying image information in an elevator car as claimed in claim 1 wherein said light modulator includes an electrooptical Pockets cell modulator utilizing the Pockels effect.

5. An apparatus for displaying image information within an elevator car as claimed in claim 1 wherein said light modulator includes a combination of a galvanometer mirror and a collecting lens.

6. An apparatus for displaying image information within an elevator car as claimed in claim 5 wherein said galvanometer mirror is fixedly connected to a galvanometer coil and arranged along an axis through a spring to be rotatable about said axis so that said mirror deflects a light beam through a rotational angle proportional to a current flowing through said galvanometer coil so as to scan a projection field projected by said projector with said light beam in a direction predetermined by said axis.

7. An apparatus for displaying image information within an elevator car as claimed in claim 1 wherein said projector is disposed on a wall surface opposing to a door of said elevator car to project said deflected light beam on the inner surface of said door.

8. An apparatus for displaying image information in an elevator car as claimed in claim 1 wherein said projector is disposed on one of lateral wall surfaces of said elevator car to project said deflected light beam on the other of lateral wall surfaces.

9. An apparatus for displaying image information in an elevator car as claimed in claim 1 wherein said signal source, said laser and said light modulator are disposed in a machine room.

10. An apparatus for displaying image information in an elevator car as claimed in claim 1 wherein said signal source, said laser and said light modulator are located on a supervision board disposed in a supervision room.

* * * * *